Feb. 24, 1942.  L. G. MORTEN  2,274,087
ELECTRICITY CONDUCTOR UNIT
Filed Oct. 28, 1939
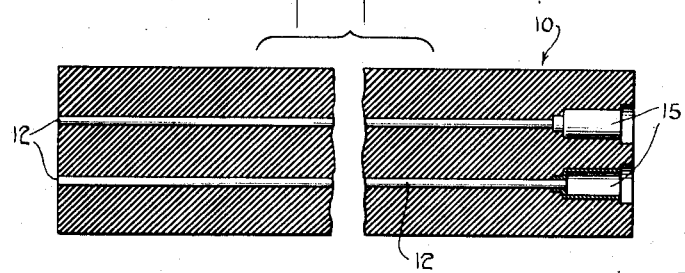
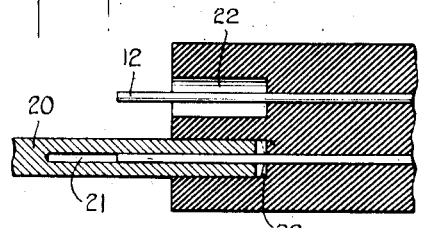
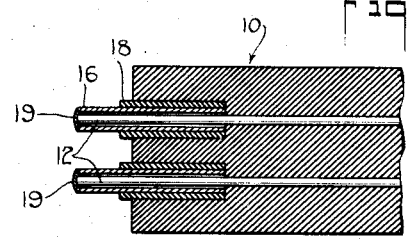
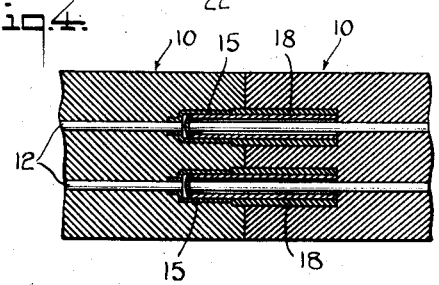
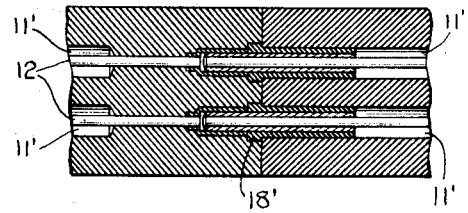
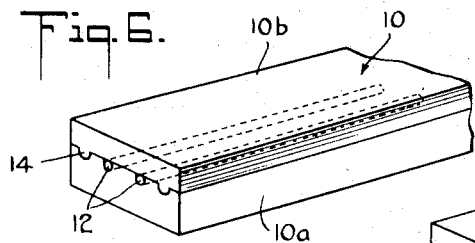
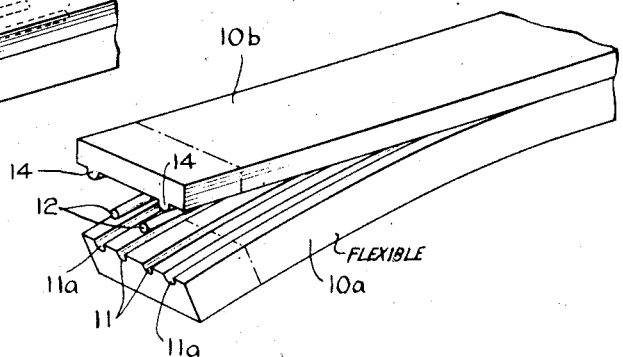
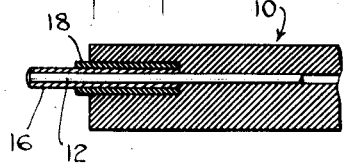
INVENTOR,
Louis G. Morten
BY Henry J. Lucke
HIS ATTORNEY Patented Feb. 24, 1942

2,274,087

UNITED STATES PATENT OFFICE 2,274,087

ELECTRICITY CONDUCTOR UNIT

Louis G. Morten, Teaneck, N. J., assignor to John B. Pierce Foundation, New York, N. Y., a corporation of New York Application October 28, 1939, Serial No. 301,737

3 Claims. (Cl. 174—88)

The present invention relates to improved electricity conductor units, and particularly to conductor units made in standardized lengths and adapted for seriatim mechanical and electrical interconnection by connection means embodying male and female conductor elements.

It is an object of the present invention to provide electrical conductor units of the class described, wherein the length of any such unit may be foreshortened at the place of installation, to conform to conditions unique to such installation.

In the present invention, the improved electricity conductor unit desirably comprises a body portion of electrical insulation material, within which body are provided a desired plurality of electrical conductors, said conductors terminating at one end of the unit in suitable electrically conductive socket means, preferably countersunk within the body of the unit, and terminating, at the opposite end, in enlarged diameter male connection means projecting from the end wall of the body portion.

At the male connection end portion of the conductor units, the electrical conductors thereof project beyond the face of the unit, and over such projecting ends, electrically conductive sleeves are placed, said sleeves extending over the conductors throughout the full length of extension thereof, and penetrating into the body of the unit to any desired extent. Such electrically conductive sleeves are preferably mechanically and electrically secured to the electrical conductors at the outer terminal ends thereof, and desirably, such connection is made by soldering or like means affording the removal of the sleeves from the conductors if circumstances so require.

Desirably, the body portion of my improved electrical conductor units is of laminated construction, the plies thereof being separable; most preferably, the electrical conductors are disposed in grooves formed within a lamination at the surface thereof, whereby upon separation of certain laminations, a desired portion of the said body material may be cut away to afford the suitable projection of the electrical conductors from the face of the body upon the re-securement of the laminae.

When it is desired to shorten a conductor unit, the sleeves may be removed from the male ends thereof, as by melting the solder connection and drawing the sleeve outwardly of the body of the unit. The unit may then be cut, at such end portion, to the desired length. Upon separation of the laminae of the body portion over a suitable extent, a desired part of the body material may be removed therefrom to afford the required extension of conductors, whereupon the conductive sleeves may be replaced over the projecting conductors and electrically connected thereto. The foreshortened conductor unit is then in form for interconnection with an adjacent unit to complete the desired circuit.

The present application is a continuation in part of my presently copending application Serial No. 704,189 entitled "Electricity conductor units," filed December 27, 1933, now U. S. Patent No. 2,218,545, dated October 22, 1940.

In the accompanying drawing:

Fig. 1 is a plan sectional representation of an electricity conductor unit foreshortened, at the male end portion, to a desired length;

Fig. 2 is a representation of the unit of Fig. 1, the body portion of which has been cut to afford a projection of the conductor means from the face thereof, and further treated to remove body material from about the said conductors;

Fig. 3 is a plan sectional representation of the male end portion of the electricity conductor unit;

Fig. 4 is a representation of a pair of interconnected conductor units;

Fig. 5 is a sectional representation of a second form of conductor unit, adjacent conductor units being mechanically and electrically interconnected;

Fig. 6 is a perspective of the male end portion of the conductor unit shown in Fig. 1;

Fig. 7 is a perspective of the male end portion of the unit of Fig. 1, showing separation of the laminae to afford removal of material from the body portions thereof; and Fig. 8 is a vertical section taken through a conductor of the unit of Fig. 3.

Referring to the drawing, Figures 6 and 7 show an electrical conductor unit 10 of indeterminate length. The body of said conductor unit is desirably laminated, comprising a base portion 10a and a cap or cover portion 10b, both preferably being of electrical insulation material. Base portion 10a may have a plurality of longitudinally disposed grooves therein; the central grooves 11, 11, may accommodate electrical conductors 12, 12, whereas the outermost grooves 11a, 11a, cooperate with suitable beading 14, 14, formed on the under side of the cap portion 10b. Upon assembly of the cap and base portion, electrical conductors 12, 12 are snugly confined within the conductor unit; the tongue and groove interconnection of base 10a and cap 10b affords accurate assembly of the respective cap and base portions, maintains the electrical conductors against displacement, and precludes access to the conductors.

Desirably, base portion 10a is of relatively soft rubber or other suitably flexible insulation material; cover portion 10b may be of a stiffer material such as a molded plastic to afford rigidity to the structure and to impart desired aesthetic or decorative values thereto.

It is preferable to position the conductors 12 within the respective grooves 11 without cementing or otherwise securing the same; said grooves 11, therefore, over at least a portion of the length of the unit are of suitable size to engage the conductors snugly. Pursuant to such construction, and as shown in Fig. 7, the conductors 12 may be lifted out of the grooves 11 upon separation of the cap and base portions of a unit. The respective cap and base portions of the conductor unit may be adhesively bonded together to render the cap and base portions separable when desired, as by the insertion of a suitable edge tool along the edge of the juncture of the respective portions.

Figures 1 and 3 show, respectively, the female and male end portions of standardized conductor units. The female socket portions preferably include suitable sockets 15, 15, of electrical conductive material, soldered or otherwise electrically connected to the conductors 12. As shown, it is preferable to have the sockets 15 countersunk within the body of the conductor unit 10. At the male end of a conductor unit, the conductors 12 project from the end surface of the body of the unit, and such projecting conductors may be fitted with tubular electrically conductive elements 16 having an outside diameter arranged for a snug mechanical engagement with the inner wall of a socket 15 of an adjacent unit. Placed over each of said tubular conductive elements is a sleeve 18 of electrical insulation material. Said sleeve 18 projects beyond the end surface of the conductor unit body to an amount equal to the depth of countersink of the sockets 15 so that, as shown in Fig. 4, the conductors of a conductor unit may be protected against accidental short circuit at the point of connection of adjacent units.

As shown in Fig. 3, the sleeves 16 may be secured to their associated conductors 12 by solder 19 or the like, at the outer end only. The solder is preferably of a suitable melting point, subject to electrical code requirements.

It is a feature of the present invention that the standardized lengths of electrical conductor units may readily be cut to any required length, so that after the interconnection of a series of standardized length conductor units, a unit may be shortened to conform to the overall length requirement of the particular installation.

In shortening such conductor unit, it is desirable first to remove the tubular conductors 16 from the conductors 12, as by melting the solder at the tips thereof, and drawing the conductor 16 and the insulating sleeves 18 outwardly from the body of the conductor. A suitable amount of the male end portion of the conductor unit body may be cut therefrom, the cut also severing the conductors 12, as typified by the showings of Figs. 1 and 6. To provide for the extension of conductors 12 from the end face of the shortened unit, the cap and base portions may be separated over a desired length and a suitable portion of such cap and base removed, as indicated by the broken lines of Fig. 7. The cap and base portion may be re-cemented or otherwise restored to original status.

By a suitable reaming or boring tool 20, represented diagrammatically in Figure 2, said tool 20 having a central bore 21 of such diameter that the tool 20 will fit snugly over the conductors 12, the electrical insulation material of the cap and base portions surrounding the conductors 12 may be removed therefrom, leaving the countersunk portions 22, shown in Fig. 2. Such countersunk portions have an outside diameter suitable to accommodate the insulating sleeves 18.

After the positioning of the insulating sleeves 18, the sleeves 16 may be passed over the projecting end portions of the conductors 12, and soldered or otherwise secured thereto to restore the mechanical and electrical connection therebetween.

The foreshortened unit is then adaptable for interconnection with the socketed portion of a preceding unit, as shown in Fig. 4.

A second embodiment of the improved conductor unit is shown in Figure 5. In such embodiment, it will be noted that the grooves 11', 11', within which the conductors 12 are disposed, are, throughout the greater proportion of the length of a conductor unit, of adequate size to receive the sleeves 18 without additional reaming treatment of such grooves. It is desirable to firmly secure a portion of the conductors 12 near the end socket portion of the conductor unit, and for that reason it is shown that the enlarged groove portions of the conductor units do not extend throughout the full length thereof. It is also desirable that the socket portions of each conductor unit be firmly affixed to the respective conductor body and cap portions, to avoid accidental displacement and disarrangement of the sockets.

In the embodiment of Figure 5, therefore, the shortening of a unit pursuant to the foregoing description is simplified by the elimination of the reaming step.

Figure 5 also shows a modified form of insulating sleeve, such modified form contemplating a collar portion 18' of such sleeve, to limit the depth of insertion of the sleeve into the enlarged grooves 11', and thereby to insure that the joint between contiguous conductor units is adequately protected against short circuits.

As will be understood, the enlarged diameters of the sleeves 16 and the sockets 15, in comparison with the diameter of the therewith associated conductors 12, afford adequate area of surface contact of the sleeves 16 with the sockets 15 of an interconnected unit, thus insuring substantially unimpeded electric flow through such interconnected units.

Whereas I have described my invention by reference to specific forms thereof, it will be understood that many changes and modifications may be made without departing from the spirit of the invention.

I claim:

1. An electricity conductor unit, comprising a body having a base portion of flexible electrical insulation material, said base portion having a plurality of longitudinally extending grooves formed in an upper wall surface thereof, a cap portion removably secured to said base portion and forming a closure for such grooves, electricity conductor means positioned within said grooves in mutually insulated spaced relationship and projecting from said body at an end thereof.

tubular electricity conductive means encompassing said projecting conductors and extending into said body portion in removable association therewith, said tubular conductive means being removably secured to said conductors by means disposed at the projecting portions thereof, and tubular electricity conductive socket means secured to said conductor means and to said body at the end opposite from said projecting conductor means, said socket means having an inside diameter equal to the external diameter of said tubular electrically conductive means and a depth greater than the total length of projection of said tubular electricity conductive means from the end faces of said body.

2. An electricity conductor unit for seriatim electrical and mechanical connection with like conductor units, comprising a body having a base portion of flexible electrical insulation material formed with grooves at an upper face extending longitudinally of said base portion and coextensive therewith, a relatively rigid cap portion removably secured to said base portion and serving to close said longitudinal grooves, electricity conductor means arranged within said grooves in mutually insulated spaced relationship and projecting from said body at an end face thereof, tubular electricity conductive means encompassing said projecting conductors and extending into said body portion in removable association therewith, said tubular conductive means being removably secured to said conductors by soldering or like means disposed at the projecting terminal ends thereof, and tubular electrically conductive socket means secured to said conductor means at the opposite end thereof and disposed within said body portion, said socket means having an inside diameter substantially equal to the outside diameter of the exposed portion of said tubular conductive means and a depth greater than the length of such exposed portion, whereby the tubular conductive means of one unit may be inserted into the socket means of a contiguous conductor unit to afford electrical connection of the conductor means of said interconnected units.

3. An electricity conductor unit for seriatim electrical and mechanical interconnection with like conductor units comprising a body having a base portion of flexible insulation material provided with longitudinally extending grooves, electrical conductor means removably contained within said grooves, and a relatively rigid cap portion removably secured to said base portion and overlying said electrical conductor means to maintain the same within said grooves, said conductor means projecting from an end of said body portion, electrically conductive sleeve means encompassing said projecting electrical conductor means and extending into said body portion in removable association therewith, said sleeve means being removably secured to said conductor means at the projecting ends thereof, said conductor means at their opposite ends being electrically connected to electrically conductive socket means disposed wholly within the body of said unit; the grooves of said base portion having a diameter at least equal to the diameter of said sleeve means except in a zone adjacent the connection of the conductor means with said socket means, in which zone the said grooves approximate the external diameter of the conductor means to snugly confine such conductor means.

LOUIS G. MORTEN.